United States Patent
Bourgeois et al.

(10) Patent No.: US 10,232,671 B2
(45) Date of Patent: Mar. 19, 2019

(54) RIBBED ANTI-NOISE DEVICE FOR A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Frederic Bourgeois, Clermont-Ferrand (FR); Francois-Xavier Bruneau, Clermont-Ferrand (FR); Olivier Muhlhoff, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 209 days.

(21) Appl. No.: 15/112,023

(22) PCT Filed: Jan. 9, 2015

(86) PCT No.: PCT/EP2015/050357
§ 371 (c)(1),
(2) Date: Jul. 15, 2016

(87) PCT Pub. No.: WO2015/107008
PCT Pub. Date: Jul. 23, 2015

(65) Prior Publication Data
US 2016/0332490 A1    Nov. 17, 2016

(30) Foreign Application Priority Data
Jan. 17, 2014  (FR) ...................... 14 50401

(51) Int. Cl.
*B60C 11/13*  (2006.01)
*B60C 19/00*  (2006.01)
*B60C 11/04*  (2006.01)

(52) U.S. Cl.
CPC ........ *B60C 11/1353* (2013.01); *B60C 11/042* (2013.01); *B60C 11/1307* (2013.01);
(Continued)

(58) Field of Classification Search
CPC ......... B60C 11/1353; B60C 2011/1361; B60C 11/1307; B60C 2011/1338; B60C 19/002
See application file for complete search history.

(56) References Cited

FOREIGN PATENT DOCUMENTS

FR      2983431 A1    6/2013
JP      07-309105 A  * 11/1995
(Continued)

OTHER PUBLICATIONS

Machine translation for Japan 2006-341655 (Year: 2017).*
Machine translation for Japan 07-309105 (Year: 2018).*

*Primary Examiner* — Steven D Maki
(74) *Attorney, Agent, or Firm* — Dickinson Wright PLLC

(57) ABSTRACT

A tire tread comprising at least one groove that is delimited by two opposing walls that are connected by a groove bottom. The groove has a width and a depth and at least one resonance-noise-reducing device. The device is formed of at least one blade that is fixed to one of the walls delimiting the groove or to the groove bottom and at least partially closes the cross section of the groove. The each flexible blade comprises two main walls which close the cross section of the groove. End walls delimit the main walls and a connecting wall connecting to the tread. Each blade further comprises at least one raised rib on at least one of its main walls, (Continued)

and the raised rib starts from the wall or the bottom bearing the blade and extends over at least 50% of the length of the flexible blade.

8 Claims, 2 Drawing Sheets

(52) U.S. Cl.
CPC .... *B60C 19/002* (2013.01); *B60C 2011/1338* (2013.01); *B60C 2011/1361* (2013.01)

(56) References Cited

FOREIGN PATENT DOCUMENTS

| | | | |
|---|---|---|---|
| JP | 2006-341655 A | * | 12/2006 |
| JP | 2010052699 A | | 3/2010 |

* cited by examiner

RIBBED ANTI-NOISE DEVICE FOR A TIRE

CROSS-REFERENCE TO RELATED APPLICATIONS

The present invention claims priority to PCT International Patent Application Serial No. PCT/EP2015/050357 filed Jan. 9, 2015 entitled "Ribbed Anti-Noise Device For Tyre," which claims the benefit of FR Patent Application Serial No. 1450401 filed Jan. 17, 2014, the entire disclosures of the applications being considered part of the disclosure of this application and hereby incorporated by reference.

BACKGROUND OF THE INVENTION

1. Field of the Invention

The present invention relates to tire treads and more particularly to treads comprising grooves, the latter being provided with closure devices so as to reduce the noise generated by air made to resonate in these grooves during running.

2. Related Art

It is known that as each groove, notably grooves of circumferential overall orientation, enters the contact patch in which the tire is in contact with a roadway during running, air is made to circulate along these grooves. With the roadway, each groove forms a pipe that has two open ends.

The air in this pipe forms a vibrating air column, the resonant frequency of which is dependent on the length separating the two ends of the pipe and therefore on the length of groove affected by contact with the roadway.

This resonance of the air in the grooves has the effect of generating, in a vehicle fitted with these tires, a noise inside the vehicle and a noise outside the vehicle. These inside and outside noises usually correspond to a frequency of 1 kHz or thereabouts, which corresponds to a frequency to which the human ear is particularly sensitive.

In order to reduce such resonance noise, it is known practice (see for example patent document FR2715891) to arrange in each circumferentially oriented groove, or groove with a circumferential overall orientation, a plurality of relatively thin flexible blades or membranes made of rubber compound, each flexible blade or membrane occupying the entire cross section of the groove or at the very least a large proportion of this cross section so as to form a closure device.

Each flexible blade may extend from the bottom of the groove or may be fixed to at least one of the walls delimiting the said groove. Relatively thin here means that each flexible blade is able to flex in order to at least partially open the cross section of the groove under the effect of a flow of liquid notably when driving in the wet. These same blades remain in the position in which the groove is closed when driving in the dry, thus blocking the circulation of air.

By virtue of these flexible blades, the length of the air column in each circumferential groove is reduced by comparison with the overall length of the groove in the contact patch, and this results in a change in the resonant frequency. The shift in frequency is towards resonant frequency values to which the human ear is less sensitive.

Of course, in order to maintain the water drainage function needed for driving on a roadway covered with water, it is necessary for each membrane to be able to flex appropriately under the action of the pressure of the water and thus at least partially open the cross section of the groove in order to allow a sufficient flow of liquid.

Definitions

A block is a raised element formed on the tread and delimited by voids or grooves and comprising lateral walls and a contact face intended to come into contact with the roadway. This contact face has a geometric center defined as being the barycenter or center of gravity of the face.

A radial direction in this document means any direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

Axially towards the outside means a direction oriented towards the outside of the internal cavity of the tire.

Equatorial midplane means a plane perpendicular to the axis of rotation and passing through the axially outermost points of the tire, this equatorial plane dividing the tire into two equal or substantially equal parts.

The usual running conditions of the tire or conditions of use are those defined by the E.T.R.T.O. standard: these conditions of use specify the reference inflation pressure corresponding to the load-bearing capacity of the tire as indicated by its load rating and speed code. These conditions of use may also be referred to as "nominal conditions" or "usual conditions".

A cut generically denotes either a groove or a sipe and corresponds to the space delimited by the walls of material facing one another and distant from one another by a non-zero distance (referred to as the "width of the cut"). It is precisely this distance that differentiates a sipe from a groove; in the case of a sipe, this distance is suited to allowing the opposing walls delimiting the said sipe to come at least partially into contact at least in the contact patch. In the case of a groove, the walls of this groove cannot come into contact with one another under normal running conditions.

The tread surface of a tread corresponds to the surface of the tread that comes into contact with the ground when a tire provided with such a tread is being driven on.

As has already been recalled, the devices formed of flexible blades as described in the prior art—on account of the need to be able to flex under a flow of liquid—are connected either to the bottom of a groove or to one of the lateral walls delimiting a groove. In both instances, these blades come into contact with the roadway during running. During this contact, a phenomenon of relative slippage between each blade and the roadway occurs, as therefore does friction leading to blade wear. However, it has been found that the wear rate of these flexible blades is not the same as the mean tread wear. Indeed it has been observed that the tire exhibits differential wear, causing each blade to become offset towards the outside with respect to the tread surface when it has become partially worn. Aside from the fact that this is not a particularly attractive look, because these blades protrude from the tread surface, each time each blade enters the contact patch it slaps against the said roadway, generating a noise.

Document FR 2983431 A1 discloses an alternative form of a device comprising flexible blades connected to the bottom of a groove, this alternative form combining a flexible blade with an overthickness extending along the connection between the blade and the bottom of the groove. This overthickness, suited to making molding easier, does not, however, have any effect on the wearing of the blade in the part that comes into contact with a road during running.

There is therefore a need to obtain a device that reduces resonance noise in the grooves that wears more evenly or alternatively that wears in such a way as to be set back slightly from the tread surface.

BRIEF DESCRIPTION OF THE INVENTION

The present disclosure is an improvement to the resonance-noise-reducing devices comprising a plurality of flexible blades and seeks at the same time to obtain more even wear while at the same time facilitating the molding and demolding of these flexible blades.

To this end, one aspect of the disclosure is a tire tread comprising at least one groove, this groove being delimited by two opposing walls connected by a groove bottom, this groove having a width and a depth, this groove comprising at least one resonance-noise-reducing device, this device being formed of at least one flexible rubber blade fixed either to one of the walls delimiting the groove or to the bottom thereof, this flexible blade at least partially closing the cross section of the groove, each flexible blade comprising two main walls at least partially closing the cross section of the groove, end walls delimiting these main walls and a connecting wall connecting to the tread, this connecting wall being connected either to a lateral wall or to the bottom of the groove.

Each flexible blade comprises, on at least one of its main walls, at least one raised rib, this rib comprising two ends, a first end positioned on the connecting wall (or connecting face) connecting with the tread and a second end positioned with respect to the connecting wall at a distance at least equal to 50% of the total length of the flexible blade, this length of the flexible blade being measured—in a direction perpendicular to the connecting wall connecting with the tread—between the connecting wall and the end wall opposite to the said connecting wall.

Each raised rib thus formed extends along the blade in such a way as to move away from the connecting wall connecting to the tread and closer to the opposite end wall.

Advantageously, each raised rib has a maximum thickness at least equal to 0.15 times the thickness of the blade and at most equal to 2 times the same thickness and has a maximum width at least equal to 0.8 times the thickness of the blade and at most equal to 4 times the same thickness. The thickness of a flexible blade is measured as the mean distance separating the two main walls of the blade.

By modulating the rigidity of each flexible blade in contact with the roadway it has been found that, surprisingly, rubbing contact between the roadway and the flexible blade provided with at least one raised rib is sufficiently affected to modify the pattern of wear of the said flexible blade and to make it possible to obtain a better pattern of wear more compatible with customer requirements in terms of appearance. Of course, it is necessary to dimension these raised ribs so that the added stiffness does not detract from the desired function, namely sufficient flexibility under the effect of a flow of liquid to ensure satisfactory performance when driving in the wet.

Furthermore, the presence of at least one raised rib is beneficial when molding the tire because in the tire mold, these raised ribs correspond to runners conveying rubber compound for forming the flexible blade. As these runners extend over a fairly large part of the element, molding is improved. Moreover, demolding is also improved notably by better resistance of each flexible blade to tearing.

For preference, each rib is of semicylindrical shape with a radius at least equal to the thickness of the flexible blade (distance between the main walls).

In an alternative form of embodiment, a flexible blade—borne by a wall delimiting a groove or by the bottom of the groove, comprises at least one rib, this rib having an outline which is not rectilinear. Advantageously, this outline may be curvilinear, wavy or zigzagging.

More advantageously still, each flexible blade borne by a wall delimiting a groove comprises at least two ribs extending towards the corners of the flexible blade and sufficiently close to the said corners to have an effect on the entirety of the blade. A corner here means that region of the flexible blade that is adjacent to the intersection of two end walls.

For preference, ribs are formed on the two main walls of a flexible blade. The ribs may be formed on each wall so that they are offset from one another when their distribution over each wall is considered.

The ribs may have a variable thickness along their length considered between their two ends. For preference, this thickness decreases from the end of the rib situated in the zone where the blade connects to a wall or a bottom of a groove as far as the other end of the rib.

Advantageously, each raised rib has a thickness at least equal to 0.15 times the thickness of the blade—measured outside of the zones with overthickness, and at most 1.2 times the same thickness.

This noise-reducing device may of course be implemented with any type of groove, whether this be a groove of circumferential or transverse or oblique orientation.

Further features and advantages of the disclosure will become apparent from the description given hereinafter with reference to the attached drawings which, by way of non-limiting examples, show some embodiments of the subject matter of the disclosure.

DETAILED DESCRIPTION OF THE ENABLING EMBODIMENT

In the figures that accompany this description, the same reference signs may be used to describe alternative forms of the disclosure where these reference signs refer to elements of the same nature, whether this nature be structural or indeed functional.

Figures 1, 2:
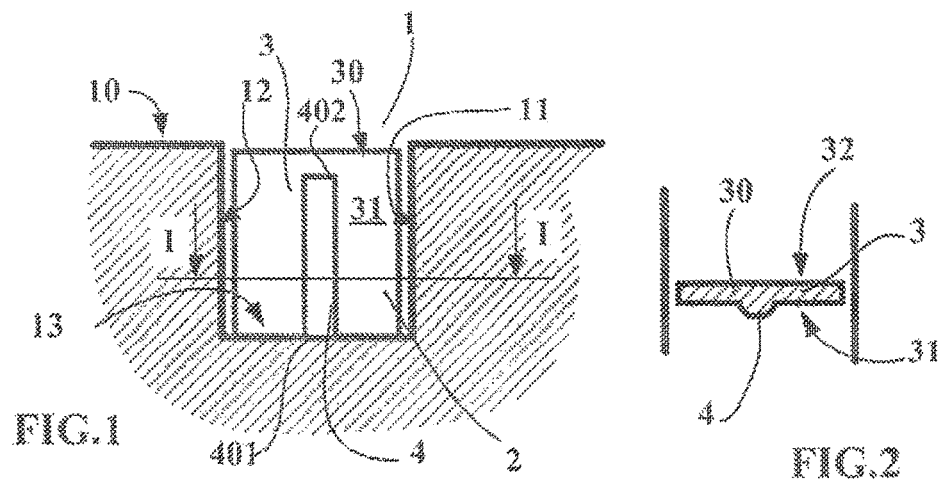
FIGS. 1 and 2 show a first alternative form according to the invention of a closure device in the closed state.

FIGS. 1 and 2 show an alternative form according to the disclosure of a closure device in the closed state.

In this first alternative form, a tread comprises a groove 1 opening onto the tread surface 10 of the tread; this groove 1 is delimited by two opposing walls 11, 12, these walls being connected by a groove bottom 13. This groove 1 comprises a plurality of resonance-noise-reducing devices 2, these devices being evenly distributed in the groove 1.

Each device 2 is formed by a single flexible blade 3 molded with the tread. FIG. 1 shows such a flexible blade 3 almost completely closing off the cross section of the groove 1 when the tread is new. This flexible blade 3 has a mean thickness equal to 0.6 mm and is able to flex under the action of a flow of liquid flowing in the groove 1, notably when driving in the wet.

This flexible blade 3 is secured to the bottom 13 of the groove and comprises main faces 31, 32 closing off the cross section of the groove; one main face 31 is visible in FIG. 1. This flexible blade 3 further comprises end faces including a contact face 30 which is intended to come into contact with the ground when running and another face referred to as the connecting face connecting with the bottom 13. When new, the contact face 30 of the flexible blade is offset slightly inwards with respect to the tread surface 10.

Furthermore, this flexible blade 3 on one of its main faces 31 comprises a raised reinforcing rib 4 of elongate shape and semicircular cross section. This rib 4 has two ends, a first end 401 is connected to the bottom of the groove and a second end 402 is close to the end face of the blade that is intended to come into contact with the ground during running. The length of this rib 4 measured between its two ends is here equal to 80% of the height of the blade measured perpendicularly to its connecting face connecting with the bottom of the groove. This raised rib 4 starts at the bottom 13 of the groove and extends over almost all the height of the flexible blade, which means to say almost as far as the contact face 30 of the blade. This rib 4 is positioned in the middle of the main face 31. Thus, the additional stiffness generated by the presence of this rib 4 is limited so as to allow the blade 3 to flex under the action of a flow of liquid in the groove but is enough to modify the conditions of contact of the blade with the roadway during running. This then results in an improvement to the wearing of the flexible blade 3 because this blade 3 has its contact face 30 come into contact with the roadway at substantially the same level with respect to the tread surface 10 of the tread for each rotation of the wheel and it no longer protrudes from this surface when the tread has become part worn.

In this particular instance, the rib 4 visible in FIG. 2, which is in section on I-I shown in FIG. 1, is formed on a single main face 31. It is thus also possible to benefit from a directional effect by positioning this rib 4 in such a way as to limit flexing in one direction by comparison with flexing in an opposite direction.

Figures 3, 4:
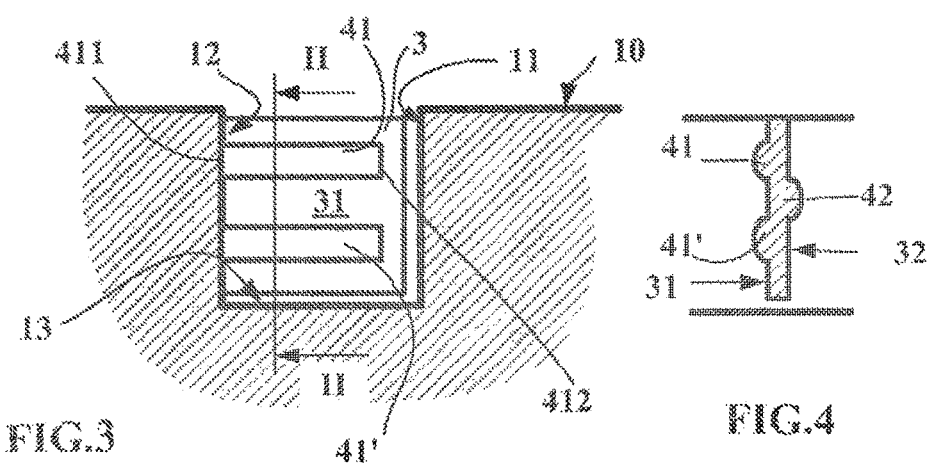
FIGS. 3 and 4 show a second alternative form of the disclosure.

In a second alternative form of the disclosure shown in FIGS. 3 and 4, a tread comprises at least one groove 1 bearing, on one of the walls 11, 12 delimiting this groove, a flexible blade 3 acting as a resonance-noise-reducing device during running. In this particular instance, the connecting face of the flexible blade 3 is borne by the lateral wall 12.

This blade 3 extends into the depth and width of the groove 1 in such a way as to close off the groove to the circulation of air. Moreover, this blade 3 comprises three raised reinforcing ribs 41, 41', 42, two of these raised ribs being formed on one main face 31 while the third is formed on the other main face 32. These ribs of elongate shape and semicircular cross section extend from that wall of the tread that bears the flexible blade and over almost all of the length of the flexible blade (here corresponding to the width of the groove). Furthermore, these ribs 41, 41', 42 are arranged in such a way as to be in offset positions from one another.

Each rib extends between a first end 411 on the lateral wall delimiting the groove and a second end 412 positioned near the end face itself situated near the other lateral wall delimiting the same groove. The length of each rib is here equal to 90% of the total width of the flexible blade. The presence of these ribs enhances the elastic return nature needed to return to the closed position when a flow of fluid stops flowing.

Figure 5:
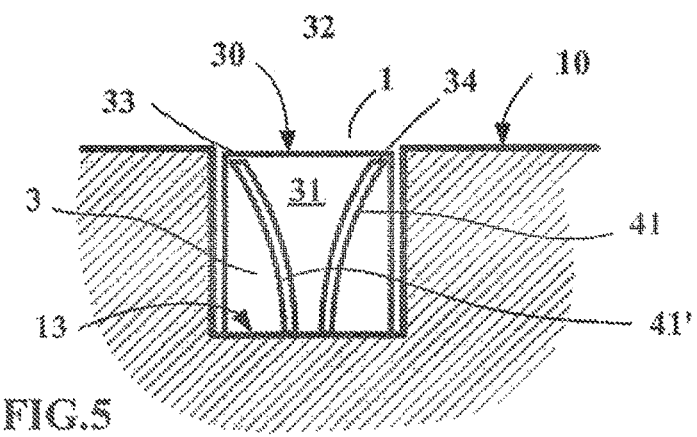
FIG. 5 shows a third alternative form of the disclosure.

In a third alternative form of the disclosure shown in FIG. 5, a flexible blade 3 borne by the bottom 13 of a groove 1 comprises, on its two main faces 31, 32, two raised ribs 41, 42 of curvilinear shape. Each rib 41, 42 starts at the bottom 13 of the groove 1 and extends as far as a corner 33, 34 of the blade close to the end wall 30 intended to come into contact with the roadway during running for each rotation of the wheel.

This alternative form, aside from making it possible to address the stated problem of flexible blade wear, offers a further advantage: that of making the operation of molding the blade easier.

Figure 6:
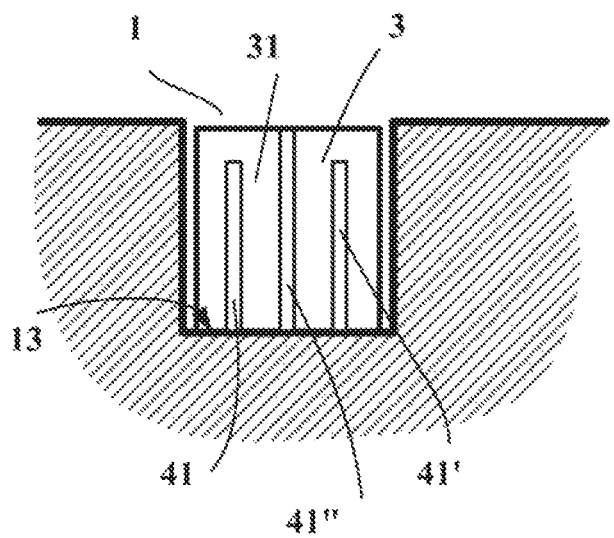
FIG. 6 shows a fourth alternative form of the disclosure.

In another alternative form shown in FIG. 6, three raised ribs 41, 41', 41" of semicircular cross section and of radius of 0.4 mm are arranged on one main face 31 of a flexible blade 3 of thickness of 0.7 mm borne by the bottom 13 of a groove 1. The intermediate rib 41", namely the rib situated between the other two ribs 41, 41' is longer in length than the other two so as to allow the additional stiffness to be distributed suitably.

Figure 7:
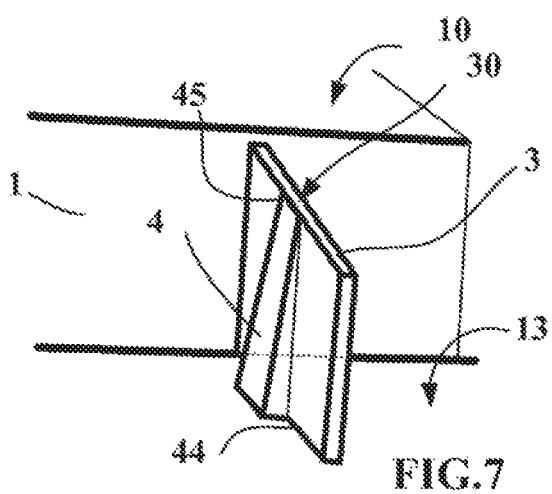
FIG. 7 shows a fifth alternative form of the disclosure.

In the fifth alternative form of the disclosure shown in FIG. 7, the flexible blade 3 fixed to the bottom 13 of a groove 1 and extending almost as far as level with the tread surface 10 of the tread comprises a raised rib 4, this rib having two ends 44, 45. A first end 44 is situated on the connecting region connecting the blade to the bottom 13 and a second end 45 is near the end wall 30 of the blade 3 that is intended to come into contact with the roadway during running. Between these two ends, the rib 4 exhibits a uniform reduction in thickness (which means to say its height relative to the blade). At its end 44 in the region of connection to the bottom 13 of the groove, the thickness is equal to 1 mm and at its other end 45 its thickness is equal to 0.2 mm.

For preference, each rib has a maximum thickness (measured at right angles to the blade) which is between 0.15 and 2 times the thickness of the flexible blade. The width of each rib (measured parallel to the blade) is advantageously between 0.8 and 4 times the thickness of the flexible blade.

While the disclosure has been described in general terms and using a number of alternative forms, it must be appreciated that this disclosure is not restricted to these alternative forms depicted and described alone. The various alternative forms described here can be combined with one another by those skilled in the art according to the objective being pursued, without departing from the scope of the disclosure as defined by the claims.

The invention claimed is:

1. A tire tread comprising:
   at least one groove, said at least one groove being delimited by two opposing walls connected by a groove bottom, said at least one groove having a width and a depth, said at least one groove including at least one resonance-noise-reducing device,
   said at least one resonance-noise-reducing device being formed of at least one flexible rubber blade fixed to one of said opposing walls delimiting said at least one groove or to said groove bottom and at least partially closing a cross section of said at least one groove,
   each flexible blade including two main walls closing said cross section of said at least one groove and including end walls delimiting said main walls and including a connecting wall that is fixed to one of said opposing walls or to said groove bottom, each flexible blade further including at least one raised rib on at least one of said main walls, said at least one raised rib having a first end and a second end, said first end being positioned on said connecting wall where said connecting wall is fixed to one of said opposing walls or to said groove bottom for modifying bending of said flexible blade about an axis where said flexible blade is fixed with one of said opposing walls or said groove bottom, said second end being positioned with respect to said connecting wall at a distance at least equal to 50% of a total length of said flexible blade, wherein said total length of each flexible blade is measured—in a direction perpendicular to said connecting wall connecting with said tire tread—between said connecting wall and said end wall opposite to the said connecting wall.

2. The tire tread according to claim 1 wherein each flexible blade has a thickness and each raised rib has a maximum thickness at least equal to 0.15 times a thickness of said flexible blade and at most equal to 2 times said thickness of said flexible blade and has a maximum width at least equal to 0.8 times said thickness of said flexible blade and at most equal to 4 times said thickness of said flexible blade.

3. The tire tread according to claim 1 wherein at least one of said flexible blades comprises at least one rib that has an outline which is not rectilinear.

4. Tire tread according to one of claim 1 wherein each flexible blade comprises at least two corners and wherein at least one of said main walls comprises two ribs extending towards the corners of said flexible blade and sufficiently close to said corners to have an effect on the entirety of said flexible blade.

5. The tire tread according to claim 1 wherein, for each of said at least one flexible blade, said at least one rib is formed on said two main walls.

6. The tire tread according to claim 1 wherein, for each of said at least one flexible blade, said at least one rib is at least two ribs that are offset from one another over each main wall.

7. The tire tread according to claim 1 wherein each raised rib has a thickness that varies decreasingly from said connecting wall of said flexible blade where said flexible blade connects to a wall or a bottom of a groove.

8. The tire tread according to claim 1 wherein each raised rib has a thickness at most equal to 1.2 times a thickness of said flexible blade.

* * * * *